United States Patent [19]

Bierlein et al.

[11] Patent Number: 5,243,676
[45] Date of Patent: Sep. 7, 1993

[54] SEGMENTED WAVEGUIDES HAVING SELECTED BRAGG REFLECTION CHARACTERISTICS

[75] Inventors: John D. Bierlein; William Bindloss, both of Wilmington, Del.; Fredrik Laurell, Solna, Sweden; Jerald D. Lee, Mendenhall, Pa.

[73] Assignee: E. I. Du Pont de Nemours and Company, Wilmington, Del.

[21] Appl. No.: 762,691

[22] Filed: Sep. 19, 1991

[51] Int. Cl.⁵ .............................................. G02B 6/10
[52] U.S. Cl. .................................. 385/122; 385/130; 385/129; 359/326; 359/328
[58] Field of Search ................................ 359/326–332; 385/122, 129–132, 141, 142

[56] References Cited

U.S. PATENT DOCUMENTS

| | | | |
|---|---|---|---|
| 4,740,265 | 4/1988 | Bierlein et al. | 156/624 |
| 4,766,954 | 8/1988 | Bierlein et al. | 156/624 |
| 4,805,975 | 2/1989 | Utaka et al. | 385/122 X |
| 4,856,006 | 8/1989 | Yano et al. | 359/328 X |
| 4,896,931 | 1/1990 | Khurgin | 350/96.12 |
| 4,995,048 | 2/1991 | Kuindersma et al. | 372/50 |
| 5,028,107 | 7/1991 | Bierlein et al. | 350/96.12 |
| 5,052,770 | 10/1991 | Papuchon | 385/141 X |
| 5,121,250 | 6/1992 | Shinozaki et al. | 359/328 |
| 5,157,754 | 10/1992 | Bierlein et al. | 385/122 |

FOREIGN PATENT DOCUMENTS

| | | |
|---|---|---|
| 0439350 | 7/1991 | European Pat. Off. |
| 0454071 | 10/1991 | European Pat. Off. |
| 2642858 | 8/1990 | France . |
| 9004807 | 5/1990 | PCT Int'l Appl. |

OTHER PUBLICATIONS

K. Shinozaki et al., Appl. Phys. Lett. 59(5), pp. 510–512 (Jul. 1991).
P. Gavrilovic et al., Appl. Phys. Lett. 58(11) pp. 1140–1142 (Mar. 1991).
R. Regener et al., J. Opt. Soc., Am. B5(2), pp. 267–277 (Feb. 1988).
R. Regener et al., Appl. Phys. B36, pp. 143–147 (1985).
O. Nilsson et al., IEEE J. of Quantum Elec. 26(12), pp. 2039–2042 (Dec. 1990).
N. Schunk et al., IEEE Photonics Tech. Lett. 1(3), pp. 49–51 (Mar. 1989).
W. F. Sharfin et al., IEEE J. of Quantum Elec. 26(10), pp. 1756–1763 (Oct. 1990).
C. J. van der Poel et al., Paper CPDP33-1/673 (May 1990), Conf. on Lasers and Electro-Optics.
D. F. Clark et al., Optics Lett. 15(22), pp. 1291–1293 (Nov. 1990).
J. Helms et al., IEEE Photonics Tech. Lett. 1(12), pp. 409–411 (Dec. 1989).
Helmfrid et al., J. Opt. Soc. Am. B8(4), pp. 797–804 (Apr. 1991).
F. A. Hopf et al., Applied Classical Electrodynamics, vol. II, Nonlinear Optics (John Wiley, 1986) pp. 29–56.
S. Somekh, et al. Appl. Phys. Lett. 21(4), 140–141 (Aug. 1972).
J. Bierlein et al., Appl. Phys. Lett. 56(18), pp. 1725–1727 (Apr. 1990).
J. A. Armstrong et al., Phys. Rev. 127(6), 1918–1939 (Sep. 1962).
J. Webjörn et al., J. Lightwave Tech. 7(10), pp. 1597–1600 (Oct. 1989).
J. Webjörn et al., IEEE Photonics Tech. Lett 1(10), 316–318 (Oct. 1989).
G. A. Magell et al., Appl. Phys. Lett., 56(2), pp. 108–110 (Jan. 1990).
C. J. van der Poel et al., Appl. Phys. Lett. 57(20), pp. 2074–2076 (Nov. 1990).
C. E. Weiman et al., Rev. Sc. Instrum. 62(1), pp. 1–19 (Jan. 1991).

Primary Examiner—Akm E. Ullah

[57] ABSTRACT

Segmented waveguides for wavelength conversion (e.g., waveguides comprising alternating sections of crystalline substrate having the formula $K_{1-x}Rb_xTiOMO_4$ where x is from 0 to 1 and M is P or As and sections of substrate material in which cations of said substrate have been partially replaced) and devices and processes employing segmented waveguides for wavelength conversion are disclosed wherein a periodic structure along the waveguide provides a Bragg reflection having a wavelength essentially equal to the wavelength of the input wave used for wavelength conversion. Also disclosed is a process for preparing a channel waveguide for a wavelength conversion system wherein areas along a portion of a crystal substrate surface used for forming the desired channel are alternately masked and unmasked during cation replacement by immersion in a molten salt.

44 Claims, 4 Drawing Sheets

SEGMENTED WAVEGUIDES HAVING SELECTED BRAGG REFLECTION CHARACTERISTICS

FIELD OF THE INVENTION

This invention relates to optical articles and more particularly to optical articles employing segmented waveguides for wavelength conversion.

BACKGROUND OF THE INVENTION

The advantages of optical systems for communications, optical storage and other applications has spurred the search for optical mediums with high nonlinearity, good optical quality, and the ability to phase match to increase the frequency of incident laser light. A challenge often encountered in the design of such systems is the efficient generation of optical waves with wavelengths which are particularly suitable for use in such systems. For example, while efficient laser generation of infrared waves is commonly available, the direct generation of certain more desirable waves having shorter wavelengths is often considerably more difficult.

One approach to providing waves with more desirable wavelengths has been wavelength conversion whereby articles containing an optical medium are used to at least partially convert optical waves incident to the medium to exiting optical waves having a different wavelength. A frequently used wavelength conversion process involves second harmonic generation where the frequency of waves generated is doubled with respect to the incident waves. In the typical process incident optical waves are directed through a medium (e.g., an inorganic nonlinear crystal) in which optical waves having wavelengths corresponding to the second harmonic of the wavelength of the incident optical wave are generated by interaction between the medium and the optical waves and exit the medium.

Typically in optical articles for wavelength conversion, waves of suitable wavelength are generated over the length of the medium. It is well known in designing such articles that unless means are provided for inhibiting destructive interference between the waves generated at various points along the medium length, the efficiency of wavelength conversion schemes such as second harmonic generation can be severely limited. Accordingly, there is generally a need to employ some technique to control the effects of such destructive interference.

In somewhat more theoretical terms, wavelength conversion systems may be generally addressed in terms of a propagation constant, k, for each of the interacting optical waves in the conversion medium. For the purposes of this description, k for each optical wave may be defined as equal to $2\pi n/\lambda$, where n is the refractive index of the medium and $\lambda$ is the wavelength of the wave. In view of the inverse relationship between the propagation constant and the wavelength, and the fact that the refractive index can be different for optical waves of different frequencies, the propagation constant for each of the interacting optical waves in the conversion medium can clearly be different.

Generally, for wavelength conversion the sum of frequencies of the interacting incident waves is equal to the sum of the frequencies of the waves generated by the interaction. To minimize the destructive interference between waves generated in the medium, it has generally been considered desirable that the sum of the propagation constants of the interacting incident waves also closely approximate the sum of the propagation constants of the waves generated by the interaction. In other words, for the optical waves involved in the wavelength conversion, it has been considered desirable for efficient wavelength conversion that the difference between the total propagation constants for the incident waves in the medium and the total propagation constants for the waves generated in the medium (i.e., the $\Delta k$ for the medium) be about zero. Adjusting a wavelength conversion system to a condition where $\Delta k$ is about zero is known as phase matching.

An optical parameter of some interest in wavelength conversion systems for a particular medium is the coherence length, coh, which is generally defined as $$\frac{2\pi}{\Delta k}.$$

For conditions where $\Delta k$ is equal to about zero, it is evident that the corresponding coh is relatively large.

In a normal phase matching process involving the nonlinear interaction of three beams in a crystal system where two beams of incident optical waves having respective frequencies $\omega_1$ and $\omega_2$ and respective wavelengths $\lambda_1$ and $\lambda_2$ are directed through a medium (e.g., a crystal or a composite material) having a refractive index $n(\omega)$ which varies as a function of the optical wave frequency, to generate optical waves having a frequency $\omega_3$ and a wavelength $\lambda_3$, a beam propagation constant k is defined for each wave beam as equal to $2\pi n(\omega)/\lambda$, and a $\Delta k$ for the optical medium is represented by the relationship:

$$\Delta k = \frac{2\pi n(\omega_3)}{\lambda_3} - \frac{2\pi n(\omega_2)}{\lambda_2} - \frac{2\pi n(\omega_1)}{\lambda_1}.$$

The maximum output intensity occurs in such a system when under conditions where the phase system is matched (i.e., $\Delta k$ is zero). The intensity of output for a phase matched system generally increases in proportion to $h^2$, the square of the length, h, of the optical medium (e.g., the crystal).

For second harmonic generation systems the frequencies $\omega_1$ and $\omega_2$ are taken as equal and as one half of the frequency $\omega_3$. Accordingly, the wavelengths $\lambda_1$ and $\lambda_2$ are twice the wavelength $\lambda_3$ and $\Delta k$ for second harmonic generation systems may be represented in terms of the above example, by the relationship:

$$\Delta k = \frac{2\pi}{\lambda_3} (n(\omega_3) - n(\omega_1)).$$

The coherence length for such second harmonic generation systems may thus be represented by the relationship:

$$coh = \frac{\lambda_3}{n(\omega_3) - n(\omega_1)} = \frac{0.5\lambda_1}{n(\omega_3) - n(\omega_1)}.$$

An alternate example of a wave conversion scheme involves generating two waves with wavelengths $\lambda_5$ and $\lambda_6$ from a single input wave of wavelengths $\lambda_4$.

Several techniques have been demonstrated or proposed for achieving efficient phase matching. (See, for example, F. A. Hopf et al., Applied Classical Electrodynamics, Volume II, Nonlinear Optics, John Wiley &

Sons, 1986, pp. 29-56.) The most common of these are the angle and temperature tuning techniques used in nearly all current applications such as second harmonic generation and sum and difference frequency generation. In angle tuning of bulk material such as a single crystal, the orientation of the crystal relative to the incident light is adjusted to achieve phase matching. The technique is generally considered inappropriate for use in waveguide structures which, by nature of their design, must be oriented in a particular direction relative to the incident waves. Temperature tuning relies on the temperature dependence of the birefringence of the material and may be used for waveguides as well as bulk material. However, for many materials the temperature dependence of the birefringence is large and, although temperature tuning is possible for waveguides in these materials, a high degree of temperature control must be provided (e.g., $+/-1°$ C.). In optical materials where the temperature dependence of the birefringence is small (e.g., $KTiOPO_4$), although a high degree of temperature control is not necessary, the range of wavelengths over which temperature tuning is possible for waveguides is small.

Phase matching for second harmonic generation using periodic variations in the refractive index to correct for the fact that $\Delta k$ is not equal to 0, can be accomplished by reflecting back both the fundamental and second harmonic beams in such a way that the reflected beams are phase matched (see, for example, S. Somekh, "Phase-Interchangeable Nonlinear Optical Interactions in Periodic Thin Films," Appl. Phys. Lett., 21, 140 (1972)). As with the methods above, the intensity of the second harmonic output increases with the square of the length of the material used. However, in practice, the overall efficiency of this method is even less than the methods discussed above.

Recently, a particularly useful wavelength conversion technique has been developed by J. Bierlein et al., which involves directing the incident optical waves for wavelength conversion through a series of aligned sections of optical materials for wavelength conversion, said sections being selected such that the sum for the series of sections of the product of the length of each section in the direction of alignment and the $\Delta k$ for that section is equal to about zero, and such that the length of each section is less than its coherence length; wherein either at least one of said materials is optically nonlinear or a layer of nonlinear optical material is provided adjacent to said series during wavelength conversion, or both. This technique is based on the discovery that wavelength conversion can be accomplished by using a series of sections of optical materials wherein the differences in the refractive indices and the section lengths are balanced to control the effects of destructive interference through the series such that the optical waves are phase matched at the end of the series even though they are not phase matched in the individual sections. (See Bierlein et al., Appl. Phys. Lett. 56 (18) pp. 1725-1727 (1990) and U.S. Pat. No. 5,028,107).

Other techniques for wavelength conversion, which are known as "quasi" phase matching techniques, and include periodic domain reversals or internal reflection have also been described (see J. A. Armstrong et al., "Interactions between Light Waves in a Nonlinear Dielectric", Phys. Rev., 127, 1918 (1962)). Quasi phase matching in optical waveguides has been described using periodically modulated $LiNbO_3$ which achieve phase matching by periodically reversing the sign of the nonlinear optical coefficient with a period length such that the product of $\Delta k$ and period length of the waveguide is about equal to $2N\pi$, where N is an odd integer. Periodically domain-inverted channel waveguides utilizing $LiNbO_3$ are described by J. Webjorn, F. Laurell, and G. Arvidsson in Journal of Lightwave Technology, Vol. 7, No. 10, 1597-1600 (October 1989) and IEEE Photonics Technology Letters, Vol. 1, No. 10, 316-318 (October 1989). Waveguide fabrication is described using titanium to achieve the periodic domain inversion, or using a periodic pattern of silicon oxide on the positive c-face of $LiNbO_3$ in combination with heat treatment and subsequent proton exchange. G. A. Magel, M. M. Fejer and R. L. Byer, Appl. Phys. Let. 56, 108-110 (1990) disclose $LiNbO_3$ crystals with periodically alternating ferroelectric domains produced using laser-heated pedestal growth. These structures generated light at wavelengths as short as 407 nm and were relatively resistant to photorefractive damage for structures of this type. However, these periodically modulated waveguides are considered difficult to fabricate and have optical damage thresholds which are too low for many applications. Hopf et al., supra, discloses at page 52 segments of nonlinear optical material where the nonlinear optical coefficient is modulated at a period equal to the coherence length for the waves in the material.

Recently, a particularly useful wavelength conversion technique has been developed by J. Bierlein et al., which involves directing the incident optical waves for wavelength conversion through a single crystal containing a series of aligned sections of optical materials for wavelength conversion selected from (a) materials having the formula $K_{1-x}Rb_xTiOMO_4$ where x is from 0 to 1 and M is selected from P and As and (b) materials of said formula wherein the cations of said formula have been partially replaced by at least one of $Rb^+$, $Tl^+$ and $Cs^+$, and at least one of $Ba^{++}$, $Sr^{++}$ and $Ca^{++}$, with the provisos that at least one section is of optical materials selected from (b) and that for optical materials selected from (b) wherein x is greater than 0.8, the cations of said formula are partially replaced by at least one of $Tl^+$ and $Cs^+$ and at least one of $Ba^{++}$, $Sr^{++}$ and $Ca^{++}$, said sections being selected such that the sum for the series of sections of the product of the length of each section in the direction of alignment and the $\Delta k$ for that section is equal to about $2\pi N$ where N is an integer other than zero, and such that the nonlinear optical coefficient of at least one section is changed relative to the nonlinear optical coefficient of at least one adjacent section. This technique makes use of the well known advantages of $KTiOMO_4$-type materials (where M is P or As), such as high nonlinearity and resistance to damage, as well as quasi phase matching, and provides for changing the sign and/or magnitude of the nonlinear optical coefficient (i.e., "d") to achieve wavelength conversion. See, U.S. patent application Ser. No. 07/732,028 and van der Poel et al., Appl. Phys. Lett. 57 (20), pp. 2074-2076 (1990).

It is well known in the art that incident light for second harmonic generation may be provided using laser diodes. It is also well known that laser diode performance can be affected by optical feedback. See C. E. Wieman et al., "Using Diode Lasers for Atomic Physics", Rev. Sci. Instrum. 62(1) (1991). Optical feedback of some wavelengths can have an undesirable effect on the laser output wavelength, thereby significantly impeding operation of apparatus relying on effective laser operation. On the other hand, optical feedback of appropriate wavelengths can be used to control the center frequency of diode lasers, thereby stabilizing operation of such apparatus. In any case, substantial surface reflection back to a diode laser is generally considered undesirable.

SUMMARY OF THE INVENTION

Segmented waveguides are provided by this invention which are suitable for use for wavelength conversion at a selected wavelength. The waveguides comprise alternating sections of optical materials which are aligned and have refractive indexes different from adjacent sections (e.g., alternating sections of crystalline substrate having the formula $K_{1-x}Rb_xTiOMO_4$ where x is from 0 to 1 and M is P or As and sections of substrate material in which cations of said substrate have been partially replaced). The waveguides of this invention are characterized by a periodic structure along the waveguide which provides a Bragg reflection for the selected wavelength which has a wavelength essentially equal to the wavelength of the input wave used for wavelength conversion. Embodiments are described which contain at least one super period consisting of a plurality of segments (each segment consisting of one section each of two optical materials) wherein at least one segment of the super period is different in optical path length from another segment thereof and wherein the sum for the super period sections of the product of the length of each section in the direction of alignment and the refractive index of the section is equal to about $N_z\lambda/2$ where $N_z$ is an integer and $\lambda$ is the wavelength of the input wave used for wavelength conversion. Optical waveguide devices are also provided which comprise at least one channel waveguide characterized by such periodic structure, a laser diode for generating input optical waves for the channel waveguide, means to couple an input optical wave into the channel waveguide, means to couple an outgoing wave out of said channel waveguide, and means to direct said Bragg reflection to said laser diode. A process for wavelength conversion is also provided wherein incident optical waves of selected wavelength are directed through a waveguide comprising alternating sections of optical materials which are aligned and have refractive indexes different from adjacent sections. The wavelength conversion process is characterized by including a periodic structure as described above along said waveguide so as to provide a Bragg reflection which has a wavelength essentially equal to the wavelength of incident optical waves. The invention is useful for providing second harmonic generation using a laser diode stabilized by Bragg reflection.

A process for preparing a channel waveguide for a wavelength conversion system in accordance with this invention comprises the steps of: (1) providing the z-cut surface of a z-cut substrate of single crystal material having the formula $K_{1-x}Rb_xTiOMO_4$ wherein x is from 0 to 1 and M is P or As with an optically smooth surface; (2) providing a molten salt containing cations selected from the group consisting of $Rb^+$, $Cs^+$ and $Tl^+$ in an amount effective to provide upon exposure to said optically smooth surface at a selected temperature for a selected time sufficient cation replacement to change the index of refraction with respect to the index of refraction of said substrate with the proviso that when the channel waveguide is to be used for quasi-phase matching, the molten salt also contains cations selected from the group consisting of $Ba^{++}$, $Sr^{++}$ and $Ca^{++}$ and when x is greater than 0.8, cations selected from $Tl^+$ and $Cs^+$, and the molten salt contains said cations in an amount effective to provide upon exposure to said optically smooth surface at said selected time and temperature a nonlinear optical coefficient which is changed with respect to the nonlinear optical coefficient of the substrate; (3) applying a masking material on said substrate to provide a pattern of aligned areas along a portion of said optically smooth surface which are alternately masked with a material resistant to said molten salt and unmasked (the lengths of said masked and unmasked areas having a periodic structure suitable to provide wavelength conversion and Bragg reflection in accordance with this invention); (4) immersing said masked substrate in said molten salt at said selected temperature for said selected time, thereby providing cation replacement in said unmasked areas; (5) removing the masking material from said substrate; and (6) finishing said substrate to provide a clean waveguide with polished waveguide input and output faces.

DETAILED DESCRIPTION OF THE INVENTION

Figure 1:
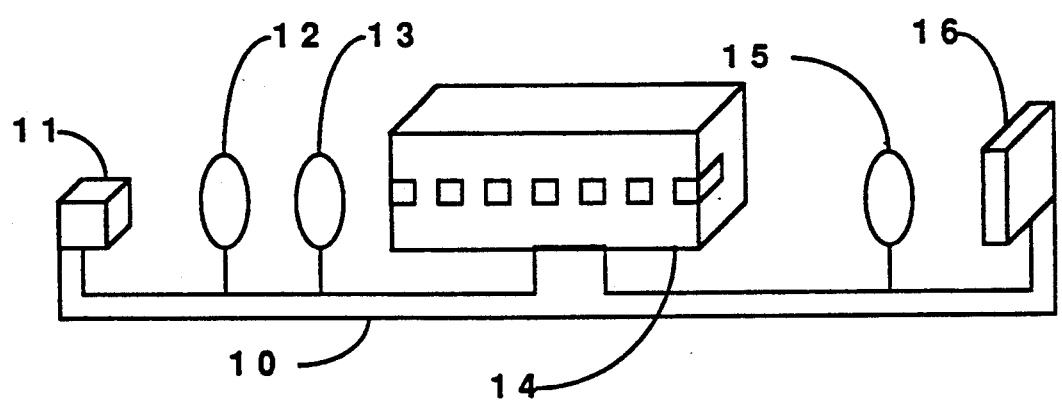
FIG. 1 is a schematic drawing of an apparatus for wavelength conversion in accordance with this invention.

This invention involves segmented waveguides suitable for at least partially converting optical waves having one wavelength, into optical waves of a different wavelength. In general, during wavelength conversion the sum of the frequencies of the incident waves and the sum of the frequencies of the generated waves is equal. Accordingly, for wavelength conversion systems where waves of frequency $\omega_1$ and wavelength $\lambda_1$ are used along with waves of frequency $\omega_2$ and wavelength $\lambda_2$ to generate waves of frequency $\omega_3$ and wavelength $\lambda_3$, $\omega_3$ is equal to the sum of $\omega_1$ and $\omega_2$; and for wavelength conversion systems where waves of frequency $\omega_4$ and wavelength $\lambda_4$ are used to generate waves of frequency $\omega_5$ and wavelength $\lambda_5$ along with waves of frequency $\omega_6$ and wavelength $\lambda_6$, $\omega_4$ is equal to the sum of $\omega_5$ and $\omega_6$.

In accordance with this invention, a segmented waveguide which is suitable for wavelength conversion at a selected wavelength and comprises alternating sections of materials which are aligned and have refractive indexes different from each other, is characterized by having a periodic structure along the waveguide which provides a Bragg reflection for said selected wavelength which has a wavelength essentially equal to the wavelength of the input wave used for wavelength conversion.

The series of sections may be represented as a plurality of p aligned adjacent sections of optical materials, $m_1, m_2, \ldots m_i, \ldots m_p$. Each section has a length $h_i$ in the direction of alignment and a refractive index $n_i(\omega)$ which varies as a function of frequency $\omega$ of the optical waves passing therethrough. The optical materials and section lengths are selected to provide the desired Bragg reflection during wavelength conversion.

A suitable periodic structure may be provided in a number of ways. One way is to space the alternating sections of materials (e.g., alternating sections of crystalline substrate having the formula $K_{1-x}Rb_xTiOMO_4$ where x is from 0 to 1 and M is P or As and sections of substrate material in which cations of said substrate have been partially replaced) precisely at a period selected such that a Bragg reflection will essentially correspond in wavelength to the wavelength of the input wave for wavelength conversion. Alternatively, not every interface need be spaced precisely at a given period, but a number of interfaces (e.g., every other interface) can be spaced such that a Bragg reflection essentially corresponding in wavelength to the wavelength of the input wave for wavelength conversion results. In each of these two alternatives the near coincidence between the wavelength of the Bragg reflectance and the input wavelength will occur only at certain discrete wavelengths.

A preferred way of achieving the Bragg reflection which has a wavelength which is essentially equal to the wavelength of the input wave for wavelength conversion involves increasing the number of wavelengths at which Bragg reflection occurs. This can be accomplished by providing a plurality of segments along the waveguide, each of which consists of one section each of two optical materials, and adjusting the length of selected sections along the waveguide such that the sections of a particular material do not all have a uniform optical path length (i.e., $n_i(\omega)h_i$). The lengths of the adjusted sections are selected such that at least one super period is provided wherein at least one segment of the super period is different in optical path length from another segment of the super period and wherein the sum for the super period sections of the product of the length of each section in the direction of alignment and the refractive index of the section is equal to about $N_z\lambda/2$, where $N_z$ is an integer and $\lambda$ is the wavelength of the input wave used for wavelength conversion, thereby resulting in the desired Bragg reflection. A super period of p sections of optical materials may be characterized as q pairs of adjacent sections of optical materials, $m_1$ and $m_2$, $m_3$ and $m_4$, ... $m_{i-1}$ and $m_i$, ... $m_{2q-1}$ and $m_{2q}$ (i.e., p=2q) each section being characterized by corresponding lengths, $h_1$, $h_2$, ... $h_i$, ... $h_{2q}$, corresponding refractive indices, $n_1$, $m_2$, ... $n_i$, ... $n_{2q}$ and corresponding propagation constants associated with each wavelength of the wavelength conversion system, $k_1$, $k_2$, ... $k_i$, ... $k_p$; and each pair of sections of material $m_{i-1}$ and $m_i$, corresponding to a segment of the super period. KTP may be modified for second harmonic generation using this "super period structure" way for achieving a desired Bragg reflection.

A process for wavelength conversion is provided in accordance with this invention which comprises the step of directing the incident optical waves for wavelength conversion through a series of aligned sections of optical materials for wavelength conversion, said sections being selected as indicated above such that the desired Bragg reflection is provided.

Where a super period structure is provided as indicated above, the intensity of a Bragg reflection is considered to depend on the length of the individual segments of the super period and also on the lengths of the two sections of each segment; and for the same input wavelength there may be several combinations of segment lengths and section lengths that provide substantially the same super period and Bragg reflections. For example, simultaneously providing balanced phase matching and Bragg reflection essentially at the input wavelength involves selecting a suitable super period and a suitable average ratio (for the super period) of the lengths of the two sections in each segment; and simultaneously providing quasi phase matching and Bragg reflection essentially at the input wavelength involves selecting a suitable super period and a suitable average segment length for the super period; but in either case suitable conditions can generally be provided using any of several combinations of section and/or segment lengths. In choosing the segment and section lengths to obtain suitable Bragg intensity, it is noted that at a given input wavelength, $\lambda$ of frequency $\omega$, the Bragg intensity will increase as (a) section lengths in a segment near the quarter wave condition, $n_1(\omega)h_1 = M_z\lambda/4$ and/or $n_2(\omega)h_2 = M_y\lambda/4$, where $n_1(\omega)$ and $h_1$ are respectively the refractive index and length of one section of a segment, $n_2(\omega)$ and $h_2$ are respectively the refractive index and length of the other section of that segment, and $M_z$ and $M_y$ are odd integers; or (b) the combination of section lengths in a segment nears the half wave condition $n_1(\omega)h_1 + n_2(\omega)h_2 = N_y\lambda/2$ where $N_y$ is an integer. It will be evident to one skilled in the art that under certain conditions both conditions (a) and (b) can be approached simultaneously. Conversely, it is noted that the Bragg intensity will decrease as (a) section lengths in a segment near the half wave condition, $n_1(\omega)h_1 = N_x\lambda/2$ or $n_2(\omega)h_2 = N_w\lambda/2$, where $N_x$ and $M_w$ are integers; or (b) the combination of section lengths in a segment nears the quarter wave condition, $n_1(\omega)h_1 + n_2(\omega)h_2 = M_x\lambda/4$, where $M_x$ is an odd integer. It will be evident that intermediate intensities can be provided by using segments with section combinations between such half wave and quarter wave conditions. For example, in a segmented waveguide having a super period of 4 segments consisting of 8 alternating sections of one material having a refractive index $n_1$ and another material having a refractive index of $n_2$, wherein all the sections having refractive index $n_1$ are of the same length, $h_1$ (i.e., the lengths of the sections having refractive index $n_2$ are not all the same) one can vary $h_1$ while maintaining the same segment lengths and super period such that $n_1h_1$ for all segments varies between $M_z\lambda/4$ (where $M_z$ is an odd integer) and $N_x\lambda/2$ (where $N_x$ is an integer), thereby affecting the intensity of the Bragg reflection. This technique can be especially useful where it is convenient (for processing purposes or otherwise) to limit the variability of segment lengths.

It is usually desirable for the intensity of the Bragg reflection to be from about 0.1 to 50 percent of the input wave intensity, especially from about 0.1 to 15 percent of the intensity of the input wave. The invention is suitable for use with diode lasers such that the Bragg reflection can be used to stabilize the output wavelength of said laser. If the Bragg reflection is being used to stabilize a laser, the optimum Bragg reflection intensity will generally depend on the type of laser.

Preferably, Bragg reflection is greater than the surface reflection of the input wave returning to the laser. The end facets of the waveguide are preferably polished at an angle of from 10° to 60° from square (i.e., from normal to the waveguide) to reduce surface reflection returning to the laser. An angle of about 20° is particularly preferred for many embodiments. Surface reflections returning to the laser can also be reduced through the use of antireflection coatings.

In accordance with this invention, two conditions are simultaneously met at a particular and desirable wavelength. These are Bragg reflection essentially of the input wavelength, and, simultaneously, phase matching for wavelength conversion.

The sections for each of said segments may, for example, be selected so that the sum of the product of $\Delta k$ for a section and the length, h, for said section over the segment (i.e., $\Delta k_1 h_1 + \Delta k_2 h_2 + \ldots \Delta k_i h_i + \ldots \Delta k_p h_p$) is equal to about zero; and each $h_i$ is less than $$\frac{2\pi}{\Delta k_i}.$$

For these "balanced phase matching" embodiments, it is desirable that the $$\sum_i \Delta k_i h_i$$

be as close to zero as practical. It should be understood, however, that perfect balance of the optical characteristics and section lengths is difficult to achieve, and that the advantages of this invention can be achieved so long as $$\sum_i \Delta k_i h_i$$

is maintained in the range of about zero; that is the overall coherence length over the entire wavelength conversion path is greater than the length of the wavelength conversion path itself. An approach to designing wavelength conversion paths to achieve this balance is to actually calculate the $\Delta k$ and section length for each section. In this approach, an advantageous balance is considered to occur when the sum over the entire wavelength conversion path of the products of the $\Delta k$ of each section with the length for that section has an absolute value less than $2\pi$. Preferably the resulting total of said product over the wavelength conversion path is less than $3\pi/2$; and most preferably it is less than $\pi$.

Accordingly, for balanced phase matching using optical articles having a number ($N_v$) of optical conversion segments in sequence, with the segments $1, 2, \ldots$ and $N_v$ respectively having $p_1, p_2, \ldots$ and $p_N$ sections, it is desirable that each segment be designed such that $$\sum_i \Delta k_i h_i$$

for the wavelength conversion system segment has an absolute value less than $2\pi/N_v$, so that the sum of the product of $\Delta k$ with section lengths for the total number of sections, $p_1 + p_2 + \ldots + p_N$, in the wavelength conversion path remain about zero in the sense described above (i.e., has an absolute value less than $2\pi$). Preferably, $$\sum_i \Delta k_i h_i$$

for each segment has an absolute value less than 1.5 $\pi/N_v$, and most preferably $$\sum_i \Delta k_i h_i$$

has an absolute value less than $\pi/N_v$.

The sections for each of said segments may alternatively be selected so that the sum of the product of $\Delta k$ for a section and the length h for said section over the segment (i.e., $\Delta k_1 h_1 + \Delta k_2 h_2 = \ldots \Delta k_i h_i + \ldots \Delta k_p h_p$) is equal to about $2\pi M_w$ where $M_w$ is an integer other than 0; and the nonlinear optical coefficient of at least one section is changed relative to the nonlinear optical coefficient of at lease one adjacent section. For these "quasi-phase matching" embodiments, the relationship of the product of the length of each section and the $\Delta k$ for each section in accordance with this invention is identical to conventional refractive index grating phase matching. However, the length of each section can in general be any length, other than zero, consistent with the condition that the sum of the product of the length of each section, $h_i$, and the $\Delta k_i$ for that section is equal to about $2M_w\pi$ over the length of the optical conversion segment, i.e., for an optical conversion segment-containing p sections (i.e., i is from 1 to p), $$\sum_i \Delta k_i h_i \approx 2M_w\pi.$$

For these embodiments, it is desirable that the $$\sum_i \Delta k_i h_i$$

be as close to $2\pi M_w$ as practical. It should be understood, however, that perfect balance of the optical characteristics and section lengths is difficult to achieve, and that the advantages of this invention can be achieved so long as $$\sum_i \Delta k_i h_i$$

is maintained in the range of about $2\pi M_w$; that is between $2\pi M_w + \delta$ and $2\pi M_w - \delta$ where $\delta$ is less than $2\pi M_w/N_t$ where $N_t$ is the total number of optical conversion segments over the entire wavelength conversion path. An approach to designing wavelength conversion paths to achieve this balance is to actually calculate the $\Delta k$ and section length for each section. In this approach, an advantageous balance is considered to occur when the sum over the entire wavelength conversion path of the products of the $\Delta k$ of each section with the length for that section is about $2\pi M_w$. Preferably the resulting total of said product is between $2\pi M_w + 1.5 \pi/N_t$ and $2\pi M_w - 1.5 \pi/N_t$, and most preferably is between $2\pi M_w + \pi/N_t$ and $2\pi M_w - \pi/N_t$.

As a practical matter whether balanced phase matching or quasi phase matching is employed, in many cases because of limitations on the precision associated with preparing a series of sections for use in this invention (including preparing the optical materials themselves) one may wish to confirm that the desired balance or the $\Delta k$'s and section lengths have been achieved by observing that the overall coherence length over the entire wavelength conversion path is greater than the length of said path. In some cases, one can observe the overall coherence length directly from examination of the weak scattering of waves along the length of the wavelength conversion path. Typically, where a super period structure is provided as indicated above, preparation of the series of sections results in a structure where simultaneous wavelength conversion and Bragg reflection at the input wavelength are very nearly met, and the desired characteristics are attained by other means such as fine tuning the temperature. It is noted that in quasi phase matching one can normally vary the average value of the ratio of section lengths within the segments of a super period while maintaining an effective wavelength conversion process. Generally, variations of this section ratio and/or the temperature produce a different degree of change in Bragg reflection and wavelength conversion. Accordingly, the super period can be fine tuned using a variation in section ratios during production as well as temperature after production.

In any case, in accordance with this invention the series of sections is characterized by having a periodic structure along the wavelength conversion path which provides a Bragg reflection (for the particular wavelength conversion) which has a wavelength essentially equal to the wavelength of the input wave used for wavelength conversion.

Clearly, for $$\sum_i \Delta k_i h_i$$

to be about zero, the $\Delta k$ for a portion of the sections of the series must be of a different sign than the $\Delta k$ for other sections (i.e., at least one $\Delta k$ must be positive and at least one $\Delta k$ must be negative). Indeed a process for wavelength conversion is provided in accordance with this invention which comprises the step of directing the incident optical waves for wavelength conversion through a wavelength conversion path having a series of aligned sections of optical materials for wavelength conversion; at least one of said optical materials having a $\Delta k$ which is positive for said wavelength conversion; at least one of said optical materials having $\Delta k$ which is negative for said wavelength conversion; and the series of sections being selected such that the sum of the products of the lengths of each section of material having a negative $\Delta k$ with its $\Delta k$ is balanced with the sum of the products of the lengths of each section of material having a negative $\Delta k$ with its $\Delta k$ so that the overall coherence length over the wavelength conversion path is greater than the length of the wavelength conversion path; and the series of sections having a periodic structure along the wavelength conversion path which provides a Bragg reflection essentially equal to the wavelength of an incident optical wave. Preferably, for efficient wavelength conversion by this process, a section having a $\Delta k$ of one sign should be adjacent to at least one section having a $\Delta k$ of the opposite sign.

Another process for wavelength conversion is provided in accordance with this invention which comprises the step of directing the incident optical waves for wavelength conversion through a single crystal containing a series of aligned sections of optical materials for wavelength conversion, said sections being selected such that the sum for the series of sections of the product of the length of each section in the direction of alignment and the $\Delta k$ for that section is equal to about $2M_w\pi$ where $M_w$ is an integer other than zero, and the nonlinear optical coefficient for at least one section is changed relative to the nonlinear optical coefficient of at least one adjacent section; and the series of sections having a periodic structure along the wavelength conversion path which provides a Bragg reflection essentially equal to the wavelength of an incident optical wave.

In a section wherein two beams of incident optical waves having respective frequencies $\omega_1$ and $\omega_2$ and respective wavelengths $\lambda_1$ and $\lambda_2$ are directed through a medium (e.g., a crystal or a Composite material) having a length $h_i$ and having a refractive index $n_i(\omega)$ which varies as a function of the optical wave frequency, to generate optical waves having a frequency $\omega_3$ and a wavelength $\lambda_3$, a beam propagation constant k is defined for each wave beam as equal to $2\pi n(\omega)/\lambda$, and a $\Delta k_i$ for the section is represented by the relationship:

$$\Delta k_i = \frac{2\pi n_i(\omega_3)}{\lambda_3} - \frac{2\pi n_i(\omega_1)}{\lambda_1} - \frac{2\pi n_i(\omega_2)}{\lambda_2}.$$

The incident optical waves of balanced phase matching wavelength conversion systems (having frequencies $\omega_1$ and $\omega_2$) are directed through a series of sections selected such that the sum of $h_i\Delta k_i$ for the series is equal to about zero; and the optical conversion segments for optical articles using such wavelength conversion systems consist of a series of sections selected such that the sum of $h_i\Delta k_i$ for the series is about zero. The incident optical waves of quasi phase matching wavelength conversion systems are directed through a series of sections selected such that sum of $h_i\Delta k_i$ for the series is equal to about $2\pi M_w$ where $M_w$ is an integer other than zero; and the optical conversion segments for optical articles using such wavelength conversion systems consist of a series of sections selected such that the sum $h_i\Delta k_i$ for the series is about $2\pi M_w$.

In the case of second harmonic generation, $\omega_1$ and $\omega_2$ are equal and are each one-half of $\omega_3$. Accordingly, for second harmonic generation, the $\Delta k_i$ for each section may be represented by the relationship:

$$\Delta k_i = \frac{2\pi}{\lambda_3} (n(\omega_3) - n(\omega_1)).$$

Alternatively, in a section where a beam of incident optical waves having a frequency $\omega_4$ and wavelength $\lambda_4$ is directed through a medium having a length $h_i$ and having a refractive index $n_i(\omega)$ which varies as a function of the optical wave frequency, to generate two beams of optical waves having respective frequencies $\omega_5$ and $\omega_6$, and respective wavelengths $\lambda_5$ and $\lambda_6$, a beam propagation constant $k_i$ is defined for each wave beam as equal to $2\pi n_i(\omega)/\lambda$, and a $\Delta k_i$ for that section is represented by the relationship:

$$\Delta k_i = \frac{2\pi n_i(\omega_6)}{\lambda_6} - \frac{2\pi n_i(\omega_5)}{\lambda_5} - \frac{2\pi n_i(\omega_4)}{\lambda_4}.$$

The incident optical waves of such wavelength conversion systems (having frequency $\omega_4$) are directed through a series of sections such that the sum of $h_i\Delta k_i$ for the series is equal to about zero for balanced phase matching and about $2\pi M_w$ for quasi-phase matching. The optical conversion segments for optical articles using such wavelength conversion systems consist of a series of sections selected such that the sum of $h_i \Delta k_i$ for the series is about zero for balanced phase matching and about $2\pi M_w$ for quasi-phase matching.

In any case, a coherence length $coh_i$ is defined for each section by the equation:

$$coh_i = \frac{2\pi}{\Delta k_i}.$$

In general the lengths, $h_i$, can each be different and are each in the range of 1 $\mu$m to 50 $\mu$m. In practice the ratio of adjacent section lengths, (i.e., $h_{i-1}:h_1$) is usually in the range of 1:20 to 20:1. The width of each section normally ranges from 0.2 $\mu$m to 50 $\mu$m and is preferably within the range of from 1 $\mu$m to 20 $\mu$m, and most preferably within the range of from 2 $\mu$m to 10 $\mu$m. The depth of each section can range from 0.1 $\mu$m to 50 $\mu$m and is preferably within the range of from 1 $\mu$m to 20 $\mu$m, and most preferably within the range of from 2 $\mu$m to 10 $\mu$m. For quasi phase matching there is preferably at least about 1% difference between the nonlinear optical coefficient for at least one section and the nonlinear optical coefficient for at least one adjacent section.

For waveguides, the total number of sections provided can depend on such factors as the optical materials used and the waveguide length. A range of about 400 to 4000 sections can be provided in a typical 5.0 mm long waveguide. Longer waveguides can have up to 10,000 sections, or even more. However, articles using only about twenty sections are also considered to be within the scope of this invention.

In some embodiments for second harmonic generation by quasi phase matching a series of generally uniform segments, each having two sections (i.e., section 1 having a length $h_1$ and a refractive index at input wavelength, $\lambda_1$ of $n_1(\omega_1)$ and a refractive index at the second harmonic wavelength, $\lambda_3$, of $n_1(\omega_3)$; and section 2 having a desired length $h_2$ and a refractive index of the input wavelength of $n_2(\omega_1)$ and a refractive index of the second harmonic wavelength $n_2(\omega_3)$) are chosen such that the sum $\Delta n_1 h_1 + \Delta n_2 h_2$ equals about $M_w \lambda_1$, where $\Delta n_1 = n_1(\omega_1) - n_1(\omega_3)$, $\Delta n_2 = n_2(\omega_1) - n_2(\omega_3)$, and $M_w$ is an integer other than 0. Typically, for quasi-phase matching using modified KTP, $M_w$ is 1, and the sum $\Delta n_1 h_1 + \Delta n_2 h_2$ is thus about $\lambda_1$. In general, for a particular input wavelength $\lambda_1$, $h_1$ and $h_2$ can be selected so that this condition is satisfied. A desired period, $\lambda_d$, for achieving phase matching for second harmonic generation at $\lambda_1$ may be defined as the sum of $h_1$ and $h_2$ (i.e., $\Lambda_d = h_1 + h_2$).

The section lengths and the initial desired period meeting these quasi-phase matching conditions may not provide the desired Bragg reflection. Moreover, for photolith processes, $h_1$ and $h_2$ are normally adjusted by changing the lengths corresponding thereto in the photolith mask and the periods attainable by some mask generation processes may be limited in resolution to a minimum incremental size change, $\delta'$ (e.g., to about 0.1 $\mu$m increments) If the desired period (i.e., $h_1 + h_2$) does not provide suitable Bragg reflection and/or correspond to the resolution requirement of the photolith process used, the super period structure as described above, may be employed to provide a series of segments which does correspond to the resolution requirements using the following steps (a) through (d):

(a) A super period may be structured to include a plurality of segments (e.g., two, three, four, etc.) each of which corresponds to the resolution requirements of the photolith process such that an average segment length $\bar{\Lambda}$ in the super period is close to the desired period, $\Lambda_d$. For example if an average period $\bar{\Lambda}$ is desired which is equal to $h_1 + h_2$, where $h_1$ has a value that corresponds with resolution requirements and $h_2$ has a value that does not correspond with the resolution requirements of the photolith process, one can choose a length $h_2'$ which is the closest length less than $h_2$ that does correspond with the resolution requirements of the photolith process, and a length $h_2' + \delta'$ which is greater than $h_2$ where $\delta'$ is the minimum incremental size change of the photolith process. Then a period $\Lambda_a$ can be defined as $h_1 + h_2'$ for each segment of the super period having section lengths $h_1$ and $h_2'$ and another period $\Lambda_b$ can be defined as $h_1 + h_2' + \delta'$ for each segment of the super period having section lengths of $h_1$ and $h_2' + \delta'$ (i.e., $\Lambda_a + \delta'$) and an average segment period for or super period having $N_a$ segments of period $\Lambda_a$ and $N_b$ segments of period $\Lambda_b$ is given by the equation:

$$\bar{\Lambda} = (N_a \Lambda_a + N_b \Lambda_b)/(N_a + N_b)$$

where $(N_a + N_b)$ is the total number of segments in the super period. $N_a$ and $N_b$ are chosen such that the average segment period for the super period $\bar{\Lambda}$, is close to the desired period $\Lambda_d$, for achieving phase matching for second harmonic generation at $\lambda_1$. The super period length for this structure is $N_a \Lambda_a + N_b \Lambda_b$, or $(N_a + N_b)\bar{\Lambda}$.

(b) The number of half waves W contained in a segment having section lengths $h_1$ and $h_2$ can be determined from the Bragg-like equation $$W = 2(n_1(\omega_B)h_1 + n_2(\omega_B)h_2)/\lambda_B$$

where $\omega_B$ is the frequency of Bragg reflection having a wavelength $\lambda_B$. In accordance with this invention a Bragg reflection is provided having $\lambda_B$ essentially equal to $\lambda_1$. Suitable Bragg reflection will occur if W is sufficiently close to an integer (e.g., an integer $\pm 1/16$ will normally be very satisfactory). If W is not sufficiently close to an integer to obtain the desired Bragg reflection, it may be expressed as an integer, X, plus the closest fraction Y/Z where Y and Z are integers and Z is no more than 16 (i.e., $W = X + Y/Z$). The Z thus determined corresponds to a suitable number of segments in a super period to give the desired Bragg reflectance.

(c) The number of segments, Z, may not correspond with the number of segments $(N_a + N_b)$ determined for photolith processing purposes. If Z is less than $N_a + N_b$, then both Z and Y are increased so that Z equals $N_a + N_b$. If $N_a + N_b$ is less than Z, then $N_a + N_b$ is increased so that $N_a + N_b$ equals Z. It is noted that changing $N_a + N_b$ may also require recalculating the relative number of segments of period $\Lambda_a$ and period $\Lambda_b$. Again for practical purposes a maximum of 16 segments is normally sufficient for both $N_a + N_b$ and Z (i.e., 16 segments are sufficient for $\lambda_1$ and $\lambda_B$ to be close enough so that, for KTP, coincidence of $\lambda_1$ and $\lambda_B$ can be obtained by tuning techniques such as varying the temperature of the substrate material).

With Y and Z so determined the total number of half waves at $\lambda_B$ in the super period is $$N_z \simeq WZ \simeq XZ + Y, \simeq 2 \sum_i n_i(\omega_B) h_i / \lambda_B$$

where i is summed over all of the 2Z sections in the super period.

(d) Having determined the number of segments in a suitable super period, the intensity of the Bragg reflection may be adjusted through segment combination in the super period. To maximize the intensity of the Bragg reflection, a super period may be constructed using a combination of segments that are close to holding an integer number of half waves, and the segments are arranged in an order such that after each segment, the sum of half waves from all the previous segments also remains close to an integer number of half waves. The total half waves at the end of the super period will be equal to $N_z$ (i.e., $$N_z = \sum_i N_i$$

where the sum is over the number of segments from 1 to Z and where the $N_i$, not necessarily integers, are the number of half waves of the individual segments that make up the super period).

For example, to determine the segments that are close to holding an integer number of half waves for an input wavelength, $\lambda_1$, of 0.847 $\mu$m, with a segment having a 2 $\mu$m unguided section and a 2 $\mu$m guided section and an average index of refraction, $\bar{n}$ (i.e., $\bar{n}=(n_1h_1+n_2h_2)/\Lambda_d)$) of about 1.843 for KTP, the average length of a half wavelength in the segment is $h_o = \lambda/2n$, or about 0.23 $\mu$m.

Since the number of half waves in a segment is approximately equal to the period length/length of a half wavelength (i.e., $\Lambda/h_o$), the half waves may be provided for typical segments as exemplified below for conditions where a photolith limit is 0.10 $\mu$m.

TABLE A

| Period ($\mu$m) | Half Waves |
| --- | --- |
| 4.6 | 20.00 |
| 4.5 | 19.57 |
| 4.4 | 19.13 |
| 4.3 | 18.70 |
| 4.2 | 18.26 |
| 4.1 | 17.83 |
| 4.0 | 17.39 |
| 3.9 | 16.96 |
| 3.8 | 16.52 |
| 3.7 | 16.09 |
| 3.6 | 15.65 |
| 3.5 | 15.20 |

As evident from Table A segments closest to holding an integer number at half waves at 0.847 $\mu$m correspond to periods of 4.6 $\mu$m, 4.4 $\mu$m, 3.9 $\mu$m and 3.7 $\mu$m.

It is noted that for the same coincidence wavelength there may be several combinations of segments that will give the same super period. The choice of which combination to use depends on such factors as the intensity of Bragg reflection desired and the amount of reduction in second harmonic generation which can be tolerated. Typically, twenty-five percent is a reasonable upper value for the amount of SHG reduction that can be tolerated.

To summarize, a process of designing a segmented waveguide for both second harmonic generation by quasi-phase matching and Bragg reflection of a wavelength essentially equal to the wavelength of the input wave, using the super period structure of this invention, includes the steps of (a) determining an average period, $\bar{\Lambda}$, and an initial, suitable number and size of segments in the super period which satisfies process limitations for SHG using the desired input wave of wavelength $\lambda_1$; (b) determining an initial suitable number of segments for the desired Braggs reflection using the Bragg reflection relationship; (c) reconciling the number of segments determined in steps (a) and (b) if necessary by adjusting the initial number of segments to another suitable number which satisfies both process limitations and the Bragg reflection relationship; and (d) combining the segments of the super period to balance the desired intensity of Bragg reflection and the desired second harmonic generation intensity.

For example, for an input wavelength of 846 $\mu$m, where 1 segment of about 4 $\mu$m would satisfy process limitations for SHG, but the number of halfwaves for a Bragg reflection in such a segment is calculated to be 17.43 (i.e., about 17-3/7 or $N_z = 122$) a super period can be considered which has 7 segments having an average period of 4 $\mu$m.

Using the Table of "closest segments", one suitable combination includes 6 segments having a period of 3.9 $\mu$m and one segment having a period 4.6 $\mu$m. Then $\bar{\Lambda} = (6 \times 3.9 + 1 \times 4.6)/7 = 4.0$ $\mu$m, and $$N_z = 17 \times 7 + 3 = 122.$$

Another suitable combination of 7 segments is the sequence 3.9 $\mu$m/4.1 $\mu$m/4.0 $\mu$m/4.0 $\mu$m/4.0 $\mu$m/3.9 $\mu$m/4.1 $\mu$m. Again $\bar{\Lambda} = 4.0$ $\mu$m and $N_z = 122$. But since the first combination uses segments that are closer to an integer number of half waves, its Bragg reflection amplitude is larger. However, the SHG amplitude of the first is lower, but only by about 10%.

Both linear and nonlinear materials can be used in accordance with this invention. In certain embodiments at least one section of each segment has a non-zero nonlinear optical coefficient. Typically each section will be constructed of nonlinear optical materials.

Preferred optical materials for the optical articles of this invention for use in a wavelength conversion system include crystalline materials selected from single crystal material having the formula $K_{1-x}Rb_xTiOMO_4$, where x is from 0 to 1 and M is selected from the group consisting of P and As and single crystal materials of said formula where the cations of said formula are partially replaced by at least one of $Rb^+$, $Tl^+$ and $Cs^+$. For practical reasons, when using materials of said formula wherein the cations have been partially replaced and x is about 0.8 or more, the replacement cations preferably include $Cs^+$, $Tl^+$ or both $Cs^+$ and $Tl^+$. As indicated by U.S. Pat. No. 4,766,954 the use of divalent ions (e.g., $Ca^{++}$, $Sr^{++}$ and $Ba^{++}$) with $Rb^+$, $Cs^+$ and/or $Tl^+$ ions can provide a wide degree of control of refractive index. The divalent ions, as well as $Rb^+$, $Cs^+$ and/or $Tl^+$ ions can exchange with the monovalent cations of substrate material (e.g., the $K^+$ ions of a $KTiOPO_4$ substrate). Examples of articles using the materials of this invention include an article having a single crystal of $KTiOPO_4$ which has been modified (e.g., by cation exchange) to provide a waveguide of sequential sections of $KTiOPO_4$ and sections of $K_{1-x}Rb_xTiOMO_4$ where x is not zero, and an article having a single crystal of $KTiOPO_4$ which has been modified to provide a waveguide of sequential sections of $KTiOPO_4$ and sections of $KTiOPO_4$ where the cations are partially replaced by a mixture of $Rb^+$ and $Tl^+$ ions or a mixture of $Rb^+$, $Tl^+$ and $Ba^{++}$ ions.

Preferred substrate materials are single crystal materials having the formula $KTiOMO_4$ where M is P or As. Single crystal material of the formula $KTiOMO_4$ which is considered useful as a substrate material in the practice of this invention can be prepared by any method which provides a crystal of optical quality. Common methods of crystal growth include hydrothermal processes and flux processes. U.S. Pat. No. 4,305,778 discloses a suitable hydrothermal process for growing single crystals of $KTiOMO_4$ which involves using as a mineralizing solution an aqueous solution of a glass defined by specified portions of the ternary diagrams for the selected $K_2O/M_2O_5/(TiO_2)_2$ system. U.S. Pat. No. 4,231,838 discloses a suitable flux growth process for growing single crystals of $KTiOMO_4$ comprising heating selected starting ingredients, chosen to be within the region of a ternary phase diagram in which the desired crystal product is the only stable solid phase, and then controllably cooling to crystallize the desired product. When utilizing single crystals of $KTiOMO_4$ to prepare optical articles in accordance with the teachings of this invention, one can use hydrothermally grown or flux grown crystals. However, it is generally recognized that ion exchange is more difficult in hydrothermally grown crystals; and accordingly molten salt with comparatively higher levels of divalent cation (e.g., $Ba^{++}$) is often more suitable for ion exchange when hydrothermally grown $KTiOMO_4$ crystals are used.

The crystalline optical materials used for quasi-phase matching are preferably single crystal materials having the formula $K_{1-x}Rb_xTiOMO_4$ where x is from 0 to 1 and M is selected from the group consisting of P and As and single crystal material of said formula wherein the cations of said formula having been partially replaced by at least one of $Rb^+$, $Tl^+$ and $Cs^+$, and at least one of $Ba^{++}$, $Sr^{++}$ and $Ca^{++}$. At least one of the aligned sections in the series should be of an optical material of said formula wherein the cations have been partially replaced by at least one of $Ba^{++}$, $Sr^{++}$ and $Ca^{++}$. For practical reasons, when using material of said formula wherein the cations have been partially replaced and x is about 0.80 or more, the monovalent replacement cations should include $Cs^+$, $Tl^+$ or both $Cs^+$ and $Tl^+$. The sections are preferably aligned on the z surface of the crystal.

The invention may be employed for waveguide structures, bulk applications and under certain circumstances, for mixed guided and unguided wave systems. In mixed systems, each unguided length in the wave propagation direction should be less than the defocusing length of the wave in the material to minimize radiation losses between the guide sections.

The instant invention may be used to provide an optical waveguide device which is characterized by having a channel waveguide which is a segmented waveguide having a periodic structure along the waveguide which provides a Bragg reflection for an incoming optical wave at a selected wavelength which has a wavelength essentially equal to the wavelength of the input wave, and which has means to direct Bragg reflection to said laser diode, and means to couple an incoming optical wave into said channel waveguide. The waveguide may be angled at its input and output ends, thereby reducing surface reflection. The means to couple an incoming optical wave into the channel waveguide may comprise two lenses, a first lens positioned to substantially collimate the incoming optical wave and a second lens positioned to focus the collimated wave to the input end of the waveguide. Alternatively, the means to couple an incoming optical wave into the channel waveguide may comprise a butt coupling. Typically, the device will also comprise means to couple an outgoing optical wave out of said channel waveguide. The device may also comprise a solid state diode laser for producing optical waves, and optionally, temperature control means for maintaining the diode laser at a temperature suitable for producing said input optical waves.

Employment of the instant invention is illustrated by reference to the apparatus (10) shown in FIG. 1 wherein optical waves emitted by laser (11) at one wavelength may be used to generate waves at another wavelength. Lens (12) is used to focus the optical waves emitted by laser (11) through a second lens (13) to focus the optical waves on waveguide (14), which is preferably placed at an angle relative to the propagation direction of the oriented optical waves, e.g., about 20°. Wavelength conversion occurs within waveguide (14). A third lens (15) collimates the optical waves emerging from the waveguide. A filter (16) is provided in the arrangement shown to filter out any remaining optical waves which have the wavelength of the emitted waves, while allowing the optical waves of the desired wavelength which were generated within the waveguide (14) to pass through. Thus, for example, if laser (11) is a semiconductor diode laser emitting light at wavelength of about 0.85 μm, and the waveguide (14) is constructed for second harmonic generation using such incident light and to provide a Bragg reflectance at a wavelength of about 0.85 μm in accordance with this invention, the diode laser locks onto the Bragg reflectance at about 0.85 μm. The diode laser may be temperature tunable to allow for adjustments of its output wavelength within a limited range (e.g., about 1.5 Å), and because of the interaction with Bragg reflectance, the laser does not jump to random wavelengths outside of the temperature adjustment range. Filter (16) is adapted to allow optical waves of wavelength 0.425 μm to pass through while any optical waves of wavelength 0.85 μm are filtered from the collimated beam which emerges from the waveguide. A device incorporating the apparatus of FIG. 1 is considered to be an article within the scope of this invention and the waveguides themselves are considered to be articles within the scope of this invention.

Figure 2:
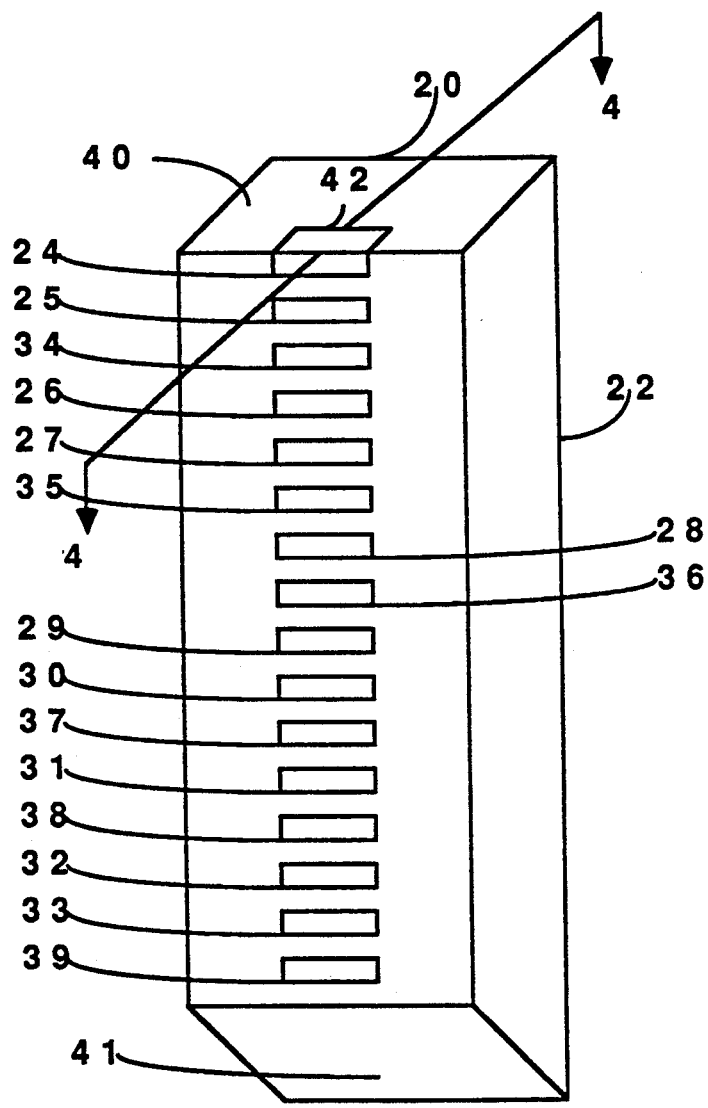
FIG. 2 is a perspective view of a waveguide for wavelength conversion in accordance with this invention.

One embodiment of a waveguide of the instant invention is shown by the waveguide for second harmonic generation illustrated at (20) in FIG. 2. The waveguide (20) as shown comprises a block (22) of crystalline material into which are embedded sections (24) through (39), all of another crystalline material wherein sections (24) through (33) have length, $h_1 + \delta'$, which is slightly greater than the length, $h_1$, of embedded sections (34) through (39) to provide proper Bragg reflectance. Normally at least one, and preferably both of the materials has nonlinear optical properties. The sections (24) through (39) are aligned between the top of the article (40) and the bottom of the article (41), such that said embedded sections along with the portions of block (22) aligned therewith comprise a waveguide. To reduce surface reflection, the top of the article (40) and the bottom of the article (41) are polished so that they form an angle from about 10° to 60° (e.g., 20°) greater than perpendicular to the waveguide. The waveguide is designed so that during operation, incident beams of optical waves enter the waveguide at the upper surface (42) of section (24) at the top (40) of the article (20). The incident beams are aligned so that optical waves pass through each of the embedded sections (24) through (39) as well as sections represented by the portions of block (22) in alignment with said embedded sections, and then exit from the bottom (41) of block (22).

Figure 3:
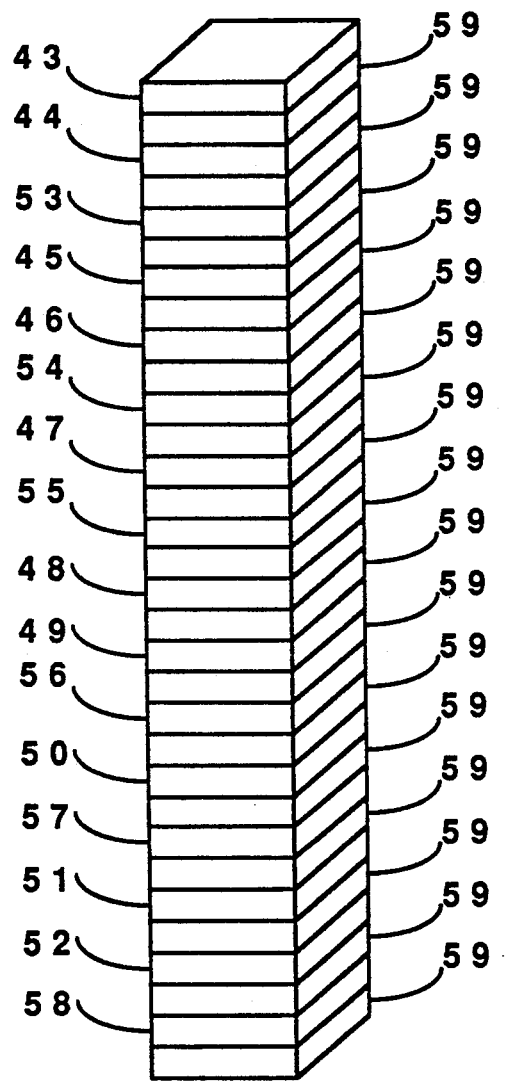
FIG. 3 is a perspective view of the aligned sections of nonlinear optical material provided by the waveguide of FIG. 2.

Accordingly, as further illustrated by FIG. 3, the waveguide embodied by FIG. 2 is designed so that beams passing therethrough, pass through a number of sections comprised of one material represented by blocks (43) through (58), and an equal number of sections comprised of another material represented by the portions at block (59) in alignment therewith. Sections (43) through (52) have length, $h_1 + \delta'$, which is slightly greater than the length, $h_1$, of sections (53) through (58) to provide proper Bragg reflectance.

Figure 4:
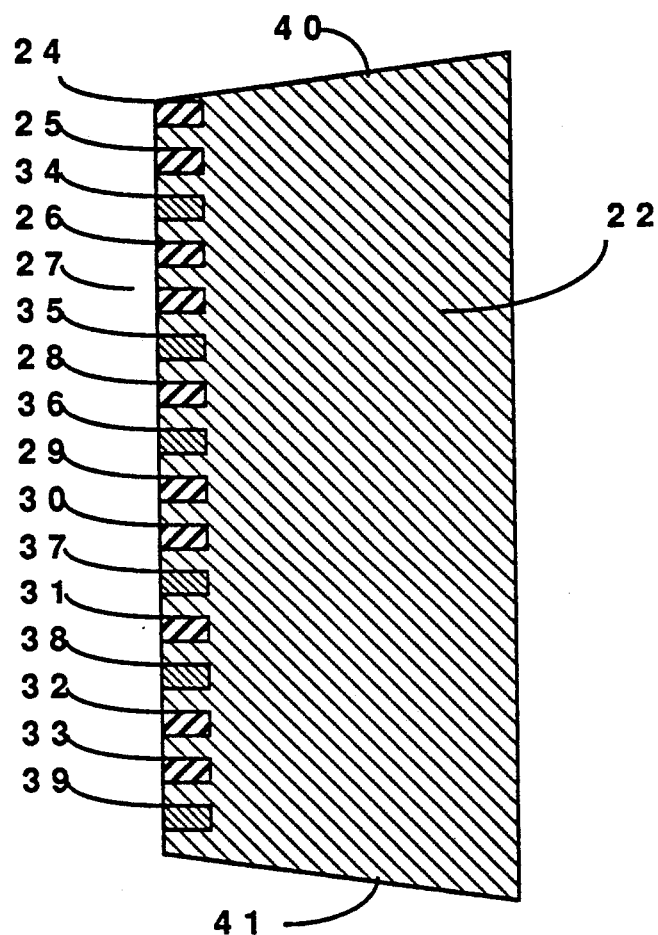
FIG. 4 is a cross-section along line 4—4 of FIG. 2 of the waveguide therein.

A cross sectional view along cut (4) of FIG. 2 of one embodiment of a waveguide of the instant invention is shown by the waveguide for second harmonic generation illustrated in FIG. 4. The waveguide as shown comprises a block (22) of crystalline material, preferably KTiOPO$_4$, into which are embedded sections (24) through (39) of another crystalline material, preferably ion-exchanged KTiOPO$_4$. The embedded sections (24) through (39) are aligned between the top of the article (40) and the bottom of the article (41), such that the embedded sections along with the portions of the block (22) aligned therewith comprise a waveguide. The waveguide is designed so that during operation the incident beams of optical waves enter the waveguide at the upper surface of embedded section (24) at the top of the article (40). To reduce surface reflection, the top of the article (40) and the bottom of the article (41) are polished so that they form an angle from about 10° to 60° (e.g., 20°) greater than perpendicular to the waveguide. The incident beams are aligned so that the optical waves pass through each of the embedded sections (24) through (39), as well as the sections represented by the portions of block (22) in alignment with the embedded sections, and then exit from the bottom of the article (41). In order to provide a Bragg reflection having substantially the same wavelength as the wavelength of light incident upon the waveguide, the embedded sections (24), (25), (26), (27), (28), (29), (30), (31), (32) and (33) have a length, $h_1 + \delta'$, which is slightly greater than the length, $h_1$, of embedded sections (34), (35), (36), (37), (38) and (39). The length, $h_2$, of the sections represented by the portions of block (22) in alignment with the embedded sections is constant and preferably equal to $h_1$. For example, in a typical waveguide useful for SHG from an incident wavelength of about 0.850 μm, $h_1 = 2.0$ μm, $\delta' = 0.1$ μm and the total number of sections, including embedded sections and the sections of the block in alignment therewith in a single group of optical conversion segments, is 32. In an actual waveguide, the groups of sections are generally repeated many times.

A means of preparing a channel waveguide of the type illustrated in FIGS. 2 and 4 in accordance with this invention is to modify a single crystal substrate of the formula $K_{1-x}Rb_xTiOMO_4$, wherein x is from 0 to 1 and M is P or As or a single crystal substrate of said formula where the cations of said formula have been partially replaced by at least one of Rb$^+$, Tl$^+$ and Cs$^+$. Preferably the cation exchange provides at least about 0.00025 difference between the surface index of refraction of cation exchanged sections and the surface index of refraction of the substrate. Preferred substrates are those of said formula. Use of these substrates for producing channel waveguides is well known in the art, and reference is made to U.S. Pat. No. 4,740,265 and U.S. Pat. No. 4,766,954 which are both hereby incorporated herein in their entirety. A typical substrate for use in producing waveguides is a crystal of KTiOPO$_4$, where x is 0 and M is P (i.e., "KTP").

As described in U.S. Pat. No. 4,740,265 and U.S. Pat. No. 4,766,954, the use of substrate masking allows replacement of cations of one optically smooth surface by ions selected from at least one of Rb$^+$ and Cs$^+$ and Tl$^+$ and a resulting change in the surface index of refraction with respect to the index at refraction of the starting substrate. In accordance with the instant invention, areas along the portion of the crystal substrate surface used for forming the desired channel may be alternately masked and unmasked during cation replacement so that the resulting channel consists of a series of aligned sections which alternate between original substrate (e.g., KTiOPO$_4$) and substrate material in which cations have been replaced, (e.g., $K_{1-x}Rb_xTiOPO_4$ where x is not zero). Standard photolithographic techniques may be used to provide the desired masking. For example, a mask of protective material (e.g., Ti) may be applied over the surface of the crystal substrate with a pattern generated therein to allow, upon suitable exposure to a molten salt, formation of sections of a second optical material by cation exchange. After cation replacement the remaining protective material may be removed.

One process for preparing a channel waveguide for a wavelength conversion system in accordance with this invention comprises the steps of: (1) providing the z-cut surface of a z-cut substrate of single crystal material having the formula $K_{1-x}Rb_xTiOMO_4$ wherein x is from 0 to 1 and M is P or As with an optically smooth surface; (2) providing a molten salt containing cations selected from the group consisting of Rb$^+$, Cs$^+$ and Tl$^+$ in an amount effective to provide upon exposure to said optically smooth surface at a selected temperature for a selected time sufficient cation replacement to change the index of refraction with respect to the index of refraction of said substrate; (3) applying a masking material on said substrate to provide a pattern of aligned areas along a portion of said optically smooth surface which are alternately masked with a material resistant to said molten salt and unmasked; (4) immersing said masked substrate in said molten salt at said selected temperature for said selected time, thereby providing cation replacement in said unmasked areas; (5) removing the masking material from said substrate; and (6) finishing said substrate to provide a clean waveguide with polished waveguide input and output faces. In this process the length of said masked and unmasked areas is selected such that after said cation replacement in the unmasked areas, a channel waveguide is provided at said portion which comprises a series of aligned sections of optical materials having a periodic structure suitable to provide wavelength conversion for incident waves at a selected wavelength and a Bragg reflection for said selected wavelength which has a wavelength essentially equal to the wavelength of said incident waves. For balanced phase matching the sum for the series of sections of the product of the length of each section and the $\Delta k$ for that section is equal to about zero, and the length of each section is less than its coherence length; wherein the $\Delta k$ for each section is the difference between the sum of the propagation constants for the incident waves for the wavelength conversion system in that section and the sum of the propagation constant for the generated waves for said wavelength conversion system in that section, and the coherence length for each section is $$\frac{2\pi}{\Delta k}$$

for that section. For waveguides to be used for quasi-phase matching, the molten salt should also contains cations selected from the group consisting of $Ba^{++}$, $Sr^{++}$ and $Ca^{++}$ and when x is greater than 0.8, cations selected from $Tl^+$ and $Cs^+$, and the molten salt contains said cations in an amount effective to provide upon exposure to said optically smooth surface at said selected time and temperature a nonlinear optical coefficient which is changed with respect to the nonlinear optical coefficient of the substrate. For quasi-phase matching the sum for the series of sections of the product of the length of each section and the $\Delta k$ for that section is equal to about $2\pi M_w$ where $M_w$ is an integer other than zero; wherein the $\Delta k$ for each section is the difference between the sum of the propagation constants for the incident waves for the wavelength conversion system in that section and the sum of the propagation constant for the generated waves for said wavelength conversion system in that section. Thallium containing substrates (i.e., substrates of the formula $K_{1-x}Rb_xTiOMO_4$ wherein the cations of said formula have been partially replaced by $Tl^+$) are also considered suitable. $KTiOPO_4$ (i.e., x is zero and M is P) is a preferred substrate.

KTP substrates may be provided in accordance with step (1) by cutting and polishing a 1 mm thick z-cut substrate (i.e., to provide a single crystal with an optically smooth surface). A masking of Ti may be provided in accordance with step (3) in conformance with standard photolithographic techniques by sequentially applying Ti on the substrate; applying a photoresist material over the Ti and curing the photoresist; providing a photomask having the desired pattern and contact exposing the photoresist through the photomask; removing the exposed portion of the photoresist; and etching away the Ti beneath the removed photoresist; and removing the unexposed photoresist, so that the patterned Ti masking remains. Typically, the substrate will be end polished before it is immersed in the molten salt; and washed after removal of the salt. Typically the substrate is finished in accordance with step (6) by polishing it. After the Ti mask is removed, the waveguide may be suitably mounted so that a laser beam may be directed therein.

It should be recognized that the $\Delta k$ for each section in which cations have been exchanged in accordance with this process for waveguide preparation can be varied somewhat by changing the section width and/or depth, and may also vary somewhat as a function of replacement ion type and concentration. Accordingly, one may wish to prepare a number of waveguides having various widths, etc. to determine optimum design for a particular wavelength conversion system using particular materials.

Practice of the invention will become further apparent from the following non-limiting Examples.

EXAMPLE 1

An end-polished $KTiOPO_4$ segmented waveguide consisting of a flux grown crystal of $KTiOPO_4$ containing a series of aligned optical conversion segments, each of which consist of a section of Rb/Tl/Ba-exchanged $KTiOPO_4$ and an adjacent section of $KTiOPO_4$ was prepared as follows: A flux grown crystal of $KTiOPO_4$ was first cut into approximately 1 mm thick z-plates. The z-surface was polished and coated with about 1000 Å of Ti by thermal evaporation. A photoresist was then contact exposed through a photomask having a waveguide pattern. The waveguide pattern consists of rectangular sections 4 micrometers in width with spacers of 2 micrometer. The exposed photoresist was removed and the Ti coating revealed beneath the removed photoresist was chemically etched using a solution of ethylene diamine tetraacetic acid (EDTA), $H_2O_2$ and $NH_4OH$ so that the $KTiOPO_4$ substrate was selectively revealed. The remaining photoresist was removed and the Ti-masked substrate was end polished. The Ti-masked substrate was polished to give a total guide length of 5 mm and ion exchanged in a molten salt bath consisting of 1 mole % $BaNO_3$, 95 mole % $RbNO_3$, and 4 mole % $TlNO_3$, at a temperature of 360° C. for an exchange time of 1 hour. After the exchange time had elapsed, the substrate was cooled to room temperature and the Tl mask was removed.

The resulting waveguide consisted of a repeating pattern of groups of optical conversion segments, each of which segments consist of two sections. One of these sections was ion-exchanged with Rb/Ba and the other section was bulk $KTiOPO_4$, i.e., substrate which has not been ion exchanged. The ion-exchanged sections, or "guiding sections", are of two length types: Type A is 2.1 microns in length and length Type B is 2.0 microns in length. These ion-exchanged sections were separated by a 2 micron long section, Type C, of bulk $KTiOPO_4$, i.e., non-guiding section. The repeating pattern of groups of optical conversion segments according to type of section is ACACBCACACBCACBCACACB-CACBCACACBC. This pattern repeats every 32 sections, or 16 optical conversion segments, throughout the length of the waveguide. Prior to use the end facets of the substrate were polished at an angle of 20° to reduce the surface reflection from the air interface back to the laser when the waveguide was used as described below.

To determine the point at which the wavelength of the laser light would be equal to the wavelength of the Bragg reflectance for this waveguide, the wavelength of a $Ti:Al_2O_3$ laser was varied in accordance with the data shown in Table 1. The conversion efficiency, coupling efficiency and wavelength of the Bragg reflectance are shown in Table 1. The wavelength at which the laser light and Bragg reflectance were equal was 0.8495 $\mu$m.

To demonstrate the practice of the invention the schematic apparatus shown in FIG. 1 was utilized with specific additional equipment to measure the various wavelengths and reflectances involved. Laser (11) was a commercially available 100 mW diode laser (type 1412-Hl, serial number I431, made by Spectra Diode Labs). Laser (11) was set up in operative combination with a commercially available temperature controller (LDT-5910, made by ILX Light Wave Corp.) to generate a light beam which was collimated with lens (12), a commercially available compact disk lens of 4.5 mm focal length and 0.5 NA. A small mirror was positioned to deflect a portion of the collimated beam to a commercially available optical spectrum analyzer (Q8381 made by Advancetech), which was been calibrated with a He:Ne laser. The portion of the collimated beam transmitted past the small mirror went through a commercially available ¼ wave plate, RZ-¼-850 made by Optics for Research, to orient the polarization of the beam perpendicular to the surface of the waveguide. The collimated beam was then passed through a commercially available nonpolarizing beam splitter, 03BSC003/073 made by Melles Griot, to verify an increase in back reflectance power at the selected Bragg wavelength. The collimated beam then passes through a second compact disk lens (13) to obtain a matched spot size so as to launch the maximum amount of power onto the waveguide (14), which was positioned using a protractor at an angle of 18 degrees relative to the collimated beam. The beam of light output from the waveguide is directed toward lens (15), a 21 ×,0.5 NA microscope lens to form a nominally collimated beam.

Using the apparatus described above, adjusting the coupling to the TM00 mode yielded transmitted pump power through the waveguide at an arbitrary wavelength. The laser temperature was increased to 25.2° C. and the laser diode power was increased to 118 mA in order to broadly the laser toward 850 nm. The laser was observed to jump to 849.9 nm according to the spectrum analyzer. Blue light was visually observed exiting the microscope lens without the need for filter (16) by holding a common white business card behind the lens. Simultaneously, light reflected through the beam splitter, which acts to split off a fraction of the light reflected back to the laser from the waveguide, was visually observed by holding a card containing IR (infrared) phosphor card in the path of the reflected beam. The power reflected back to the diode laser was calculated to be about 1.5% of the power coupled to the waveguide, assuming a 50% coupling efficiency. The power transmitted past the small mirror was 74 mW.

TABLE 1

| | Length of Segment (μm) | Wavelength of Laser Light (μm) | Conversion Efficiency (%) | Coupling Efficiency (%) | Wavelength of Bragg Reflect (μm) |
|---|---|---|---|---|---|
| 1 | 3.937500 | 0.8423000 | 65.6 | 16.9 | 0.8847 |
| 2 | 3.943750 | 0.8428500 | 67.6 | 37.0 | 0.88275 |
| 3 | 3.950000 | 0.8433500 | 87.9 | 36.0 | 0.881 |
| 4 | 3.956250 | 0.8437500 | 112.0 | 38.2 | 0.8794 |
| 5 | 3.962500 | 0.8441500 | 130.0 | 32.7 | 0.87765 |
| 6 | 3.968750 | 0.8446500 | 100.0 | 39.1 | 0.8757 |
| 7 | 3.975000 | 0.8450000 | 104.0 | 38.1 | 0.87385 |
| 8 | 3.981250 | 0.8453000 | 119.0 | 38.3 | 0.87215 |
| 9 | 3.987500 | 0.8455500 | 116.0 | 31.0 | 0.87025 |
| 10 | 3.993750 | 0.8459500 | 108.0 | 38.1 | 0.8685 |
| 11 | 4.000000 | 0.8463000 | 112.0 | 38.2 | 0.86665 |
| 12 | 4.006250 | 0.8467000 | 106.0 | 40.4 | 0.8658 |
| 13 | 4.012500 | 0.8471000 | 97.7 | 43.6 | 0.8631 |
| 14 | 4.018750 | 0.8474000 | 93.6 | 35.2 | 0.8614 |
| 15 | 4.025000 | 0.8475500 | 122.0 | 36.1 | 0.8597 |
| 16 | 4.031250 | 0.8480000 | 89.0 | 41.1 | 0.8579 |
| 17 | 4.037500 | 0.8483000 | 103.0 | 35.8 | 0.85625 |
| 18 | 4.043750 | 0.8486000 | 117.0 | 30.9 | 0.8546 |
| 19 | 4.050000 | 0.8490000 | 93.0 | 39.0 | 0.85295 |
| 20 | 4.056250 | 0.8492500 | 92.6 | 38.8 | 0.85125 |
| 21 | 4.062500 | 0.8495000 | 85.0 | 36.2 | 0.8495 |

Particular embodiments of the invention are included in the examples. Other embodiments will become apparent to those skilled in the art from a consideration of the specification or practice of the invention disclosed herein. It is understood that modifications and variations may be practical without departing from the spirit and scope of the novel concepts of this invention. It is further understood that the invention is not confined to the particular formulations and examples herein illustrated, but it embraces such modified forms thereof as come within the scope of the following claims.

What is claimed is:

1. A segmented waveguide suitable for use for wavelength conversion at a selected input wavelength, comprising alternating sections of optical materials which are aligned and have refractive indexes different from adjacent sections, and characterized by:
   a periodic structure along the waveguide which provides a Bragg reflection for said selected input wavelength which has a wavelength essentially equal to the selected input wavelength.

2. The segmented waveguide of claim 1 wherein the periodic structure comprises a plurality of segments that each contain a section of a first optical material and a section of a second optical material; and wherein the segment and section lengths are adjusted to provide a Bragg intensity of between 0.1 and 50 percent of the intensity of the input wave.

3. The segmented waveguide of claim 1 wherein the periodic structure comprises a plurality of segments that each contain a section of a first optical material and a section of a second optical material; and wherein the segment and section lengths are adjusted to provide a Bragg intensity of between 0.1 and 1.5 percent of the intensity of the input wave.

4. An optical waveguide device comprising at least one channel waveguide, a laser diode for generating input optical waves for said channel waveguide, and means to couple an input optical wave into said channel waveguide characterized by: having a channel waveguide which is a segmented waveguide of claim 1 and comprising means to direct Bragg reflection to said laser diode.

5. The device of claim 4 wherein the waveguide is angled at its input and output ends at between 10° and 60° from perpendicular to the waveguide; and wherein the means to couple an input optical wave into said channel waveguide includes a first lens positioned to substantially collimate the optical wave generated by the laser diode and a second lens positioned to focus the collimated optical wave to the input end of the waveguide.

6. The device of claim 5 further comprising means to couple an outgoing wave out of said channel waveguide.

7. The device of claim 6 further comprising temperature control means for maintaining the diode laser at a temperature suitable for producing said input optical waves.

8. An optical waveguide device comprising at least one channel waveguide, a laser diode for generating input optical waves for said channel waveguide, and means to couple an input optical wave into said channel waveguide characterized by: having a channel waveguide which is a segmented waveguide of claim 1 and comprising means to direct Bragg reflection to said laser diode.

9. The device of claim 8 wherein the waveguide is angled at its input and output ends at between 10° and 60° from perpendicular to the waveguide; and wherein the means to couple an input optical wave into said channel waveguide includes a first lens positioned to substantially collimate the optical wave generated by the laser diode and a second lens positioned to focus the collimated optical wave to the input end of the waveguide.

10. The device of claim 9 further comprising means to couple an outgoing wave out of said channel waveguide.

11. The device of claim 10 further comprising temperature control means for maintaining the diode laser at a temperature suitable for producing said input optical waves.

12. A segmented waveguide suitable for use for wavelength conversion at a selected input wavelength, comprising alternating sections of optical materials which are aligned and have refractive indexes different from adjacent sections, and characterized by:
   a periodic structure along the waveguide which provides a Bragg reflection for said selected input wavelength which has a wavelength essentially equal to the selected input wavelength; and
   said alternating sections being alternating sections of crystalline substrate having the formula $K_{1-x}Rb_xTiOMO_4$ where x is from 0 to 1 and M is P or As, and sections of substrate material in which cations of said substrate have been partially replaced.

13. The segmented waveguide of claim 12 wherein said sections are aligned and selected so that the sum of the product of the length of each section and the $\Delta k$ for that section is equal to about zero, and the length of each section is less than its coherence length; wherein the $\Delta k$ for each section is the difference between the sum of the propagation constants for the incident waves for the wavelength conversion system in that section and the sum of the propagation constants for the generated waves for the wavelength conversion system in that section, and the coherence length for each section is $$\frac{2\pi}{\Delta k}$$

for that section; and wherein at least one of said materials is optically nonlinear.

14. The segmented waveguide of claim 13 comprising alternating sections of a crystalline substrate having the formula $K_{1-x}Rb_xTiOMO_4$ wherein x is from 0 to 1 and M is P or As, and sections of substrate material in which the cations of said substrate have been replaced by sufficient cations selected from the group consisting of $Rb^+$, $Cs^+$ and $Tl^+$ to change the surface index of refraction with respect to the index of refraction of said substrate.

15. The segmented waveguide of claim 12 wherein said sections are a series of aligned sections of optical materials selected from (a) materials having the formula $K_{1-x}Rb_xTiOMO_4$ where x is from 0 to 1 and M is selected from P and As and (b) materials of said formula wherein the cations of said formula have been partially replaced by at least one of $Rb^+$, $Tl^+$ and $Cs^+$, and at least one of $Ba^{++}$, $Sr^{++}$ and $Ca^{++}$, with the provisos that at least one section is of optical materials selected from (b) and that for optical materials selected from (b) wherein x is greater than 0.8, the cations of said formula are partially replaced by at least one of $Tl^+$ and $Cs^+$ and at least one of $Ba^{++}$, $Sr^{++}$ and $Ca^{++}$, wherein said sections are selected so that the sum of the product of the length of each section and the $\Delta k$ for that section is equal to about $2\pi M_w$ where $M_w$ is an integer other than zero, and so that the nonlinear optical coefficient of at least one section is changed relative to the nonlinear optical coefficient of at least one adjacent section; wherein the $\Delta k$ for each section is the difference between the sum of the propagation constants for the incident waves for the wavelength conversion system in that section and the sum of the propagation constant, for the generated waves for the wavelength conversion system in that section.

16. The segmented waveguide of claim 15 having alternating sections of $KTiOPO_4$ and $KTiOPO_4$ wherein the have been partially replaced by $Ba^{++}$, and at least one of $Tl^+$ and $Rb^+$.

17. The segmented waveguide of claim 15 comprising alternating sections of a crystalline substrate having the formula $K_{1-x}Rb_xTiOMO_4$ wherein x is from 0 to 1 and M is P or As, and sections of substrate material in which the cations of said substrate have been replaced by sufficient cations selected from the group consisting of $Rb^+$, $Cs^+$ and $Tl^+$ and sufficient cations selected from the group consisting of $Ba^{++}$, $Sr^{++}$ and $Ca^{++}$ to change the nonlinear optical coefficient by at least 1% with respect to the nonlinear optical coefficient of said substrate.

18. The segmented waveguide of claim 15 wherein there is at least about 1% difference between the nonlinear optical coefficient for at least one section and the nonlinear optical coefficient for at least one adjacent section; and wherein there is at least about 0.00025 difference between the surface index of refraction of said at least one section and the surface index of refraction of said at least one adjacent section.

19. A segmented waveguide in accordance with claim 12 comprising alternating sections of single crystal $KTiOPO_4$ substrate and sections of substrate material in which the cations of said substrate are partially replaced by $Rb^+$ and $Ba^{++}$.

20. A segmented waveguide in accordance with claim 19 wherein said sections form a waveguide having a width of about 4 $\mu$m; and wherein the length of each KTP section is about 2 $\mu$m and the replaced sections include sections 2 $\mu$m in length and sections 2.1 $\mu$m in length.

21. A segmented waveguide suitable for use for wavelength conversion at a selected input wavelength, comprising alternating sections of optical materials which are aligned and have refractive indexes different from adjacent sections, and are characterized by:
   a periodic structure along the waveguide which provides a Bragg reflection for said selected input wavelength which has a wavelength essentially equal to the selected input wavelength; and
   said segmented waveguide containing at least one super period consisting of a plurality of segments that each consist of one section each of two optical materials; wherein at least one segment of the super period is different in optical path length from another segment thereof; and wherein the sum for the super period sections of the product of the length of each section in the direction of alignment and the refractive index of the section is equal to about $N_z\lambda/2$ where $N_z$ is an integer and $\lambda$ is a wavelength of the input wave used for wavelength conversion.

22. The segmented waveguide of claim 21 wherein the alternating sections of the waveguide have alignment and refractive indexes suitable for second harmonic generation by quasi-phase matching at the selected input wavelength.

23. The segmented waveguide of claim 21 wherein said sections are aligned and selected so that the sum of the product of the length of each section and the $\Delta k$ for that section is equal to about zero, and the length of each section is less than its coherence length; wherein the $\Delta k$ for each section is the difference between the sum of the propagation constants for the incident waves for the wavelength conversion system in that section and the sum of the propagation constants for the generated waves for the wavelength conversion system in that section, and the coherence length for each section is $$\frac{2\pi}{\Delta k}$$

for that section; and wherein at least one of said materials is optically nonlinear.

24. The segmented waveguide of claim 23 comprising alternating sections of a crystalline substrate having the formula $K_{1-x}Rb_xTiOMO_4$ wherein x is from 0 to 1 and M is P or As, and sections of substrate material in which the cations of said substrate have been replaced by sufficient cations selected from the group consisting of $Rb^+$, $Cs^+$ and $Tl^+$ to change the surface index of refraction with respect to the index of refraction of said substrate.

25. The segmented waveguide of claim 21 wherein said sections are a series of aligned sections of optical materials selected from (a) materials having the formula $K_{1-x}Rb_xTiOMO_4$ where x is from 0 to 1 and M is selected from P and As and (b) materials of said formula wherein the cations of said formula have been partially replaced by at least one of $Rb^+$, $Tl^+$ and $Cs^+$, and at least one of $Ba^{++}$, $Sr^{++}$ and $Ca^{++}$, with the provisos that at least one section is of optical materials selected from (b) and that for optical materials selected from (b) wherein x is greater than 0.8, the cations of said formula are partially replaced by at least one of $Tl^+$ and $Cs^+$ and at least one of $Ba^{++}$, $Sr^{++}$ and $Ca^{++}$, wherein said sections are selected so that the sum of the product of the length of each section and the $\Delta k$ for that section is equal to about $2\pi M_w$ where $M_w$ is an integer other than zero, and so that the nonlinear optical coefficient of at least one section is changed relative to the nonlinear optical coefficient of at least one adjacent section; wherein the $\Delta k$ for each section is the difference between the sum of the propagation constants for the incident waves for the wavelength conversion system in that section and the sum of the propagation constants for the generated waves for the wavelength conversion system in that section.

26. The segmented waveguide of claim 25 having alternating sections of $KTiOPO_4$ and $KTiOPO_4$ wherein the cations have been partially replaced by $Ba^{++}$, and at least one of $Tl^+$ and $Rb^+$.

27. The segmented waveguide of claim 25 comprising alternating sections of a crystalline substrate having the formula $K_{1-x}Rb_xTiOMO_4$ wherein x is from 0 to 1 and M is P or As, and sections of substrate material in which the cations of said substrate have been replaced by sufficient cations selected from the group consisting of $Rb^+$, $Cs^+$ and $Tl^+$ and sufficient cations selected from the group consisting of $Ba^{++}$, $Sr^{++}$ and $Ca^{++}$ to change the nonlinear optical coefficient by at least 1% with respect to the nonlinear optical coefficient of said substrate.

28. The segmented waveguide of claim 25 wherein there is at least about 1% difference between the nonlinear optical coefficient for at least one section and the nonlinear optical coefficient for at least one adjacent section; and wherein there is at least about 0.00025 difference between the surface index of refraction of said at least one section and the surface index of refraction of said at least one adjacent section.

29. The segmented waveguide of claim 21 wherein the segment and section lengths are adjusted to provide a Bragg intensity of between about 0.1 and 50 percent of the intensity of the input wave.

30. The segmented waveguide of claim 21 wherein the segment and section lengths are adjusted to provide a Bragg intensity of between 0.1 and 15 percent of the intensity of the input wave.

31. A segmented waveguide in accordance with claim 21 comprising alternating sections of single crystal $KTiOPO_4$ substrate and sections of substrate material wherein the cations of said substrate are partially replaced by $Rb^+$ and $Ba^{++}$.

32. A segmented waveguide in accordance with claim 31 wherein said sections form a waveguide having a width of about 4 $\mu m$; and wherein the length of each KTP section is about 2 $\mu m$ and the replaced sections include sections 2 $\mu m$ in length and sections 2.1 $\mu m$ in length.

33. A process for wavelength conversion wherein incident optical waves of selected wavelength are directed through a waveguide comprising alternating sections of optical materials which are aligned and have refractive indexes different from adjacent sections, characterized by: said alternating sections being alternating sections of crystalline substrate having the formula $K_{1-x}Rb_xTiOMO_4$ where x is from 0 to 1 and M is P or As and sections of substrate material in which cations of said substrate have been partially replaced, and said alternating sections forming a periodic structure along said waveguide which provides a Bragg reflection which has a wavelength essentially equal to the wavelength of said incident optical waves.

34. A process for wavelength conversion in accordance with claim 33 wherein incident waves having a wavelength of about 0.85 $\mu m$ are used to generate second harmonic waves, and wherein the optical waves are directed through a waveguide having alternating sections of KTP and rubidium/barium exchanged KTP.

35. A process for second harmonic generation in accordance with claim 34 wherein the waveguide width is about 4 $\mu m$, the length of each KTP section is about 2 $\mu m$ and the exchanged sections include sections 2 $\mu m$ in length and sections 2.1 $\mu m$ in length.

36. The process for wavelength conversion of claim 33 wherein the aligned sections are pairs of adjacent sections of optical materials selected such that for each pair the sum of the product of the length of one section and its $\Delta k$ together with the product of the length of the other section and its $\Delta k$ is about zero; wherein the $\Delta k$ for each section is the difference between the sum of the propagation constants for the incident waves for the wavelength conversion system in that section and the sum of the propagation constants for the generated waves for the wavelength conversion system in that section.

37. A process for wavelength conversion wherein incident optical waves of selected wavelength are directed through a waveguide comprising alternating sections of optical materials which are aligned and have refractive indexes different from adjacent sections, characterized by: said alternating sections forming at least one super period consisting of a plurality of segments that each consist of one section each of two optical materials; wherein at least one segment of the super period is different in optical path length from another segment thereof; and wherein the sum for the super period sections of the product of the length of each section in the direction of alignment and the refractive index of the section is equal to about $N_z\lambda/2$ where $N_z$ is an integer and $\lambda$ is the wavelength of the input waves used for wavelength conversion.

38. The process for wavelength conversion of claim 37 wherein incident optical waves for wavelength conversion are directed through a series of aligned sections of optical materials for wavelength conversion, said sections being selected such that the sum for the series of sections of the product of the length of each section in the direction of alignment and the $\Delta k$ for that section is equal to about zero, and such that the length of each section is less than its coherence length; wherein the $\Delta k$ for each section is the difference between the sum of the propagation constants for the incident waves for the wavelength conversion system in that section and the sum of the propagation constant for the generated waves for the wavelength conversion system in that section, and the coherence length for each section is $$\frac{2\pi}{\Delta k}$$

for that section; and wherein at least one of said materials is optically nonlinear.

39. The process for wavelength conversion of claim 37 wherein second harmonic waves of the incident optical waves are generated.

40. The process of claim 37 wherein the input waves are generated by a laser diode.

41. The process of claim 40 wherein the Bragg reflection is greater than the surface reflection of the incident optical waves, the intensity of the Bragg reflection is from about 0.1 to 50 percent of the intensity of the incident optical waves, and the Bragg reflection is used to stabilize the output of said laser diode.

42. The process of claim 41 wherein the Bragg reflection is from about 0.1 to 15 percent of the intensity of the incident optical waves.

43. The process for wavelength conversion of claim 37 wherein incident optical waves for wavelength conversion are directed through a single crystal containing a series of aligned sections of optical materials for wavelength conversion selected from (a) materials having the formula $K_{1-x}Rb_xTiOMO_4$ where x is from 0 to 1 and M is selected from P and As and (b) materials of said formula wherein the cations of said formula have been partially replaced by at least one of $Rb^+$, $Tl^+$ and $Cs^+$, and at least one of $Ba^{++}$, $Sr^{++}$ and $Ca^{++}$, with the provisos that at least one section is of optical materials selected from (b) and that for optical materials selected from (b) wherein x is greater than 0.8, the cations of said formula are partially replaced by at least one of $Tl^+$ and $Cs^+$ and at least one of $Ba^{++}$, $Sr^{++}$ and $Ca^{++}$, said sections being selected such that the sum for the series of sections of the product of the length of each section in the direction of alignment and the $\Delta k$ for that section is equal to about $2\pi M_w$ where $M_w$ is an integer other than zero, and such that the nonlinear optical coefficient of at least one section is changed relative to the nonlinear optical coefficient of at least one adjacent section; wherein the $\Delta k$ for each section is the difference between the sum of the propagation constants for the incident waves for the wavelength conversion system in that section and the sum of the propagation constants for the generated waves for the wavelength conversion system in that section.

44. The process for wavelength conversion of claim 43 wherein second harmonic waves of the incident optical waves are generated.

* * * * *